(12) United States Patent
Sakata

(10) Patent No.: US 7,197,538 B2
(45) Date of Patent: Mar. 27, 2007

(54) TIME-DEPENDENT MESSAGE DELIVERY METHOD AND SYSTEM

(75) Inventor: Kazuhiro Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 768 days.

(21) Appl. No.: 10/153,734

(22) Filed: May 24, 2002

(65) Prior Publication Data
US 2002/0178237 A1    Nov. 28, 2002

(30) Foreign Application Priority Data
May 28, 2001    (JP)    ............... 2001-158166

(51) Int. Cl.
G06F 15/16    (2006.01)
(52) U.S. Cl. ................................ 709/206
(58) Field of Classification Search .............. 709/206, 709/200, 207; 379/200, 908, 207.3; 455/412.1, 455/414.1
See application file for complete search history.

(56) References Cited

U.S. PATENT DOCUMENTS

| | | | | |
|---|---|---|---|---|
| 5,097,429 A | * | 3/1992 | Wood et al. ................. | 702/177 |
| 5,455,576 A | * | 10/1995 | Clark et al. ..................... | 341/50 |
| 5,703,795 A | * | 12/1997 | Mankovitz .................... | 715/721 |
| 5,864,684 A | * | 1/1999 | Nielsen ........................ | 709/206 |
| 5,913,032 A | * | 6/1999 | Schwartz et al. ........... | 709/213 |
| 5,926,104 A | * | 7/1999 | Robinson ................ | 340/825.22 |
| 6,013,107 A | * | 1/2000 | Blackshear et al. .......... | 709/229 |
| 6,119,014 A | | 9/2000 | Alperovich et al. | |
| 6,480,885 B1 | * | 11/2002 | Olivier ......................... | 709/207 |
| 6,728,713 B1 | * | 4/2004 | Beach et al. ................... | 707/10 |
| 6,925,458 B2 | * | 8/2005 | Scaturro et al. ............... | 707/3 |

FOREIGN PATENT DOCUMENTS

| | | |
|---|---|---|
| JP | 10-78931 | 3/1998 |
| JP | 11-331716 | 11/1999 |
| JP | 2000-115646 | 4/2000 |
| JP | 2001-067283 | 3/2001 |
| JP | 2002-149566 | 5/2002 |

OTHER PUBLICATIONS

Langendoen et al., "Integrating Polling, Interrupts, and Thread Management", IEEE, Frontiers of Massively Parallel Computing, 1996. pp. 13-22.*
United Kingdom Search Report dated Nov. 27, 2002.
Japanese Office Action dated Dec. 21, 2004 with Partial English Translation.

* cited by examiner

Primary Examiner—Bunjob Jaroenchonwanit
Assistant Examiner—Julian Chang
(74) Attorney, Agent, or Firm—McGinn IP Law Group, PLLC

(57) ABSTRACT

A message delivery system allows a member to obtain a message delivery service at a designated time with easy operation. The message delivery system has an initialization function of initializing a list of member identification information. The list of member identification information is initialized at a predetermined initialization time. After the initialization, a member is registered in the list of member identification information in response to user request. A message is transmitted to the member newly registered in the list.

22 Claims, 9 Drawing Sheets

MEMBER INFORMATION:
taro@aaa.bbb.ccc.ddd
yamada@abc. def. ghi.jkl
suzuki@xxx.yyy.zzz
sato@aaa.bbb.ccc.ddd

RESERVED MEMBER INFORMATION
2001/03/22 8:00 taro@aaa.bbb.ccc.ddd
2001/03/22 8:00 yamada@abc.def.ghi.jkl
2001/03/22 10:00 suzuki@xxx.yyy.zzz
2001/03/22 10:15 sato@aaa.bbb.ccc.ddd
2001/03/22 12:00 taro @aaa.bbb.ccc.ddd

FIG.9

| | |
|---|---|
| 2001/03/22 6:00 | GOOD MORNING JAPAN |
| 2001/03/22 6:30 | MORNING NEWS |
| 2001/03/22 7:00 | WEATHER REPORT |
| 2001/03/22 7:30 | LOCAL NEWS |
| 2001/03/22 8:00 | PROGRAM NOTICE |
| 2001/03/22 8:15 | SERIAL DRAMA "○○" |
| 2001/03/22 8:30 | MORNING VARIETY PROGRAM |
| 2001/03/22 9:54 | NEWS |
| 2001/03/22 10:00 | DRAMA "□" |
| 2001/03/22 10:54 | NEWS |
| 2001/03/22 11:00 | TODAY'S COOKING |
| 2001/03/22 11:45 | METOROPOLITAN-AREA NEWS |
| ⋮ | |

TIME-DEPENDENT MESSAGE DELIVERY METHOD AND SYSTEM

BACKGROUND OF THE INVENTION

1. Field of the Invention

The present invention relates to a message delivery technique, which delivers messages to destinations via a network.

2. Description of the Related Art

There have been widely used data delivery services, where one server in general sends the same information to a plurality of previously registered members through a network such as the Internet. Some systems have a designated time delivery function of sending desired messages to the previously registered members at designated times. For example, there is a case where a server sends a message having contents linked to television programs and a user wishes to receive the message from the server only during the broadcast time of a user-desired television program.

As anther example, a homepage delivery system has been proposed in Japanese Patent Application Unexamined Publication No. P2001-67283A. More specifically, the delivery system receives setting data from a subscriber and stores a Web site address, a designated delivery time, a subscriber address, and search condition. When the designated delivery time has come, the system browses the homepage using the Web site address and extracts information from the homepage depending on the search condition. The extracted information is sent to the subscriber by e-mail.

When a user wishes to obtain such a designated time delivery service, however, the user must perform registration and cancellation. For example, in the case where the user wishes to receive a program-related message from a server only during the broadcast time of a user-desired television program, the user must make an entry in the server at the starting time of the user-desired television program and cancel the entry at the ending time. If the user forgets to cancel the entry, then the user will also receive undesired messages after the user-desired television program has been ended.

According to the prior art as described above, a user must frequently perform two operations, registration and cancellation, which is a burden on the user.

SUMMARY OF THE INVENTION

An object of the present invention is to provide a message delivery method and system allowing a member to obtain a message delivery service at a designated time with easy operation.

A message delivery system according to the present invention is provided with an initialization function of initializing a list of member identification information. A member is a user who has been already registered. Member identification information is used to identify a member to deliver a message. The list of member identification information is initialized at a predetermined initialization time. After the initialization, members are registered in the list of member identification information in response to user requests. A message is transmitted to these members registered in the list.

According to an embodiment of the present invention, a message delivery system includes a server; at least one member terminal; and a network. The server includes: a member memory for registering identification information of a member in response to a request of the member; an initialization time memory for storing at least one initialization time; a member manager for managing a list of identification information registered in the member memory such that, when a current time corresponds to one of said at least one initialization time, the list of identification information is initialized; and a transmission controller for transmitting a message through the network to a member terminal having identification information registered in the member memory.

According to another embodiment of the present invention, the server further includes a reserved member memory for storing a list of reserved member information including at least one reserved time designated by at least one member and identification information of said at least one member. The member manager manages the list of identification information registered in the member memory and the list of reserved member information such that, when a current time corresponds to one of said at least one initialization time, the list of identification information is initialized, and when the current time corresponds to one of said at least one reserved time, corresponding identification information is registered into the member memory; and a transmission controller for transmitting a message through the network to a member terminal having identification information registered in the member memory.

a single member is allowed to designate a plurality of reserved times at a time to store them in the reserved member memory.

Every time the transmission controller transmits a message, the member manager may determine whether the current time corresponds to one of said at least one reserved time. Also, the member manager may determine with a predetermined frequency whether the current time corresponds to one of said at least initialization time and whether the current time corresponds to one of said at least one reserved time. The member manager may determine whether each of said at least initialization time corresponds to a current time on one-time basis and whether each of said at least reserved time corresponds to a current time on one-time basis. The member manager sets said at least initialization time so as to be notified to a member. The member manager may place said at least initialization time on public view.

As described above, according to the present invention, a server automatically deletes registration of member according to previously set initialization time information. Accordingly, a user can obtain a message delivery service from a server during a specific time period by only member registration operation.

Further, according to the present invention, the server automatically performs registration of a user into a member memory at a user-designated time. Accordingly, the user can previously reserve future message reception at one or more time period.

BRIEF DESCRIPTION OF THE DRAWINGS

FIG. 2 is a schematic diagram showing an example of the information stored in a member memory of the first embodiment as shown in FIG. 1;

FIG. 3 is a schematic diagram showing an example of the information stored in an initialization time information memory of the first embodiment as shown in FIG. 1;

FIG. 6 is a schematic diagram showing an example of the information stored in a reserved member memory of the second embodiment as shown in FIG. 5;

FIG. 9 is a schematic diagram showing an example of the information of a message to be delivered after each initialization time.

DESCRIPTION OF THE PREFERRED EMBODIMENTS

First Embodiment

Figure 1:
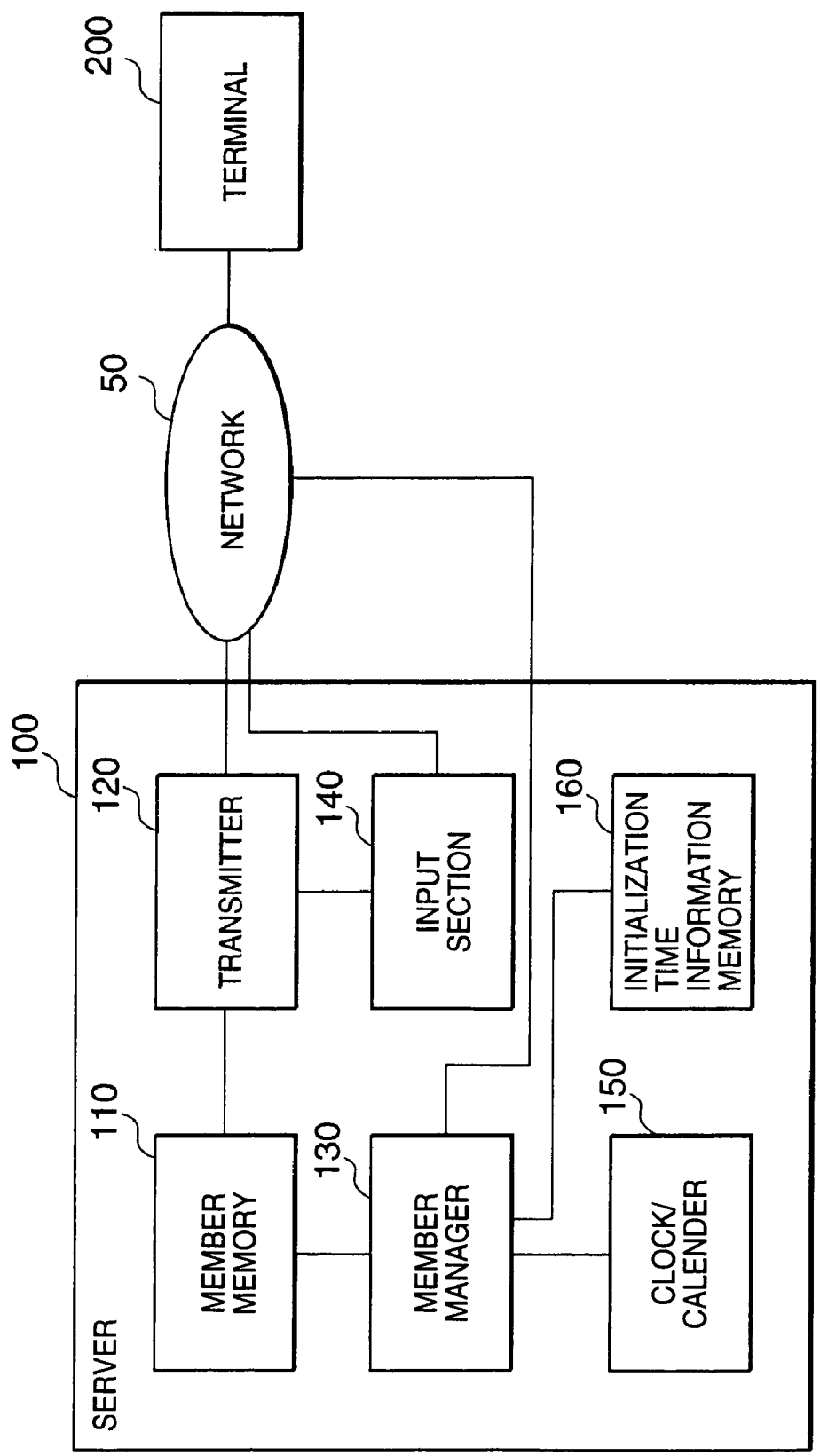
FIG. 1 is a block diagram showing a message delivery system according to a first embodiment of the present invention.

As shown in FIG. 1, it is assumed for simplicity that a message delivery system according to a first embodiment of the present invention is composed of a server 100, a terminal 200, and a network 50 which connects the server 100 and the terminal 200. The network 50 may be the Internet. The server 100 has a message delivery function of sending a message through the network 50 to a member who possesses the terminal. The terminal 200 has a function of receiving the message from the server 100 through the network 50.

In this disclosure, a member is defined as a user registered into the message delivery system. A message is defined as information sent and received via the network 50 based on some identification included therein. Such a message is, for example, electronic mail (e-mail), short message of the short message service, or the like. In the case of e-mail, an e-mail address uniquely assigned to each user or terminal is used to send and receive messages.

The server 100 includes a member memory 110, a transmitter 120, a member manager 130, an input section 140, a clock/calendar 150, and an initialization time information memory 160.

The member memory 110 stores a list of identification information of members to whom a message is to be delivered. Hereinafter, identification information is defined as information that is used to identify a member to whom a message is delivered. In the case of e-mail, an e-mail address uniquely assigned to each member may be used as identification information of the member.

In FIG. 2, an example of member information stored in the member memory 110 is shown. In this example, four e-mail addresses are stored as member information in the member memory 110: "taro@aaa.bbb.ccc.ddd", "yamada@abc.def.ghi.jkl", "suzuki@xxx.yyy.zzz" and "sato@aaa.bbb.ccc.ddd". At an initial state, no member except for specific ones is registered in the member memory 110. Hereinafter, the term "initialize", "initializing" or "initialization" is defined as resetting the state of the member memory to the initial state. In other word, the initialization of the member memory 110 causes the identification information of all the members to be cancelled.

The member manager 130 manages the information stored in the member memory 110. The input section 140 accepts a message to be sent to the members. The transmitter 120 sends a message to the terminal 200 via the network 50. The clock/calendar 150 supplies the time and calendar date to the member manager 130.

The initialization time information memory 160 stores initialization time information that is used by the member manager 130 to initialize the information stored in the member memory 110. In other words, initialization timings of the member memory 110 are stored in the initialization time information memory 160. Hereinafter, such initialization timing is referred to as initialization time. The initialization time is managed by a manager of the server 100.

Figure 3:
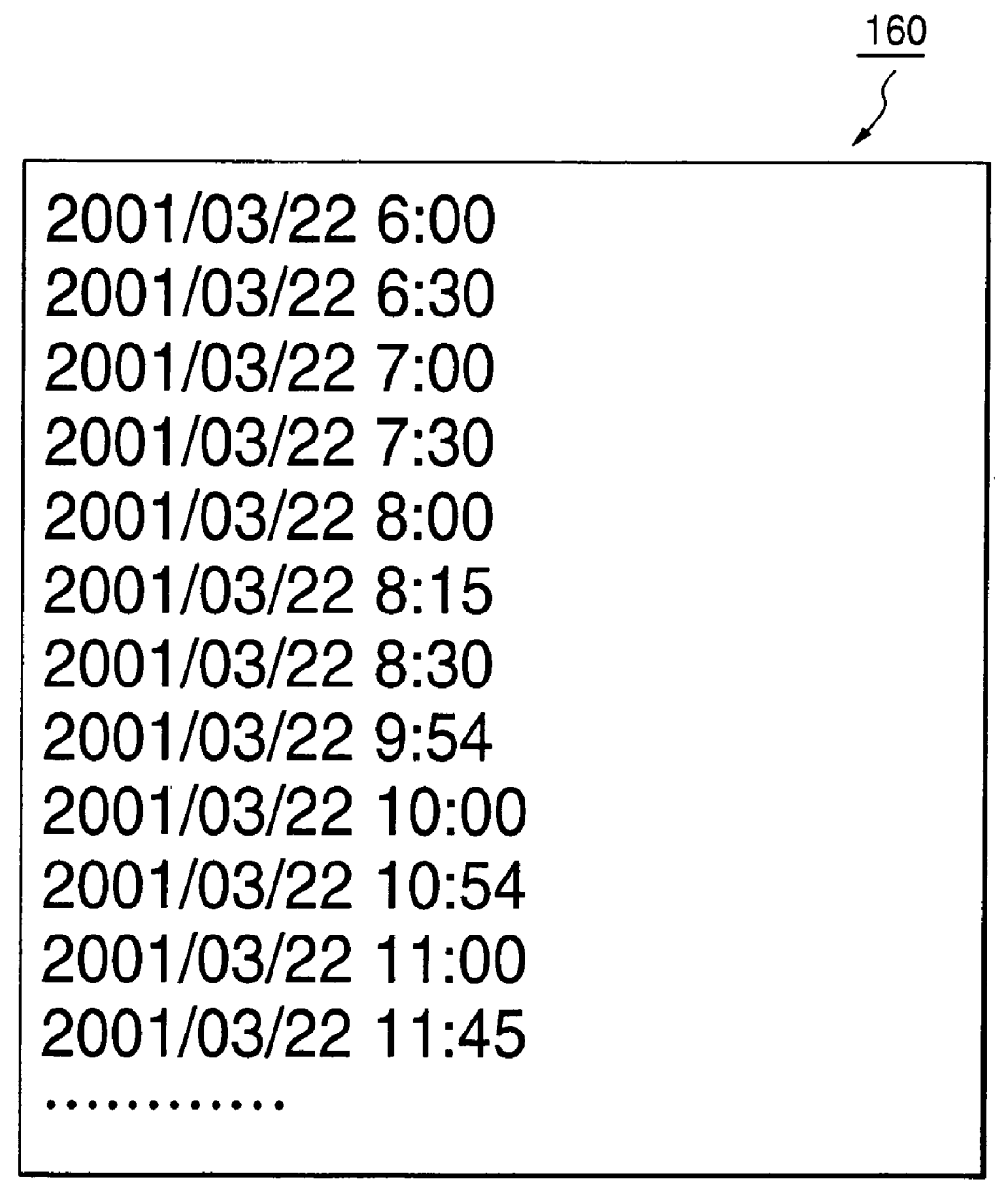

As shown in FIG. 3, an example of initialization time information stored in the initialization time information memory 160. In this example, the initialization times on Mar. 22, 2001 are each set to 6:00, 6:30, 7:00, 7:30, 8:00, 8:15, 8:30, 9:45, 10:00, 10:54, 11:00, and 11:45.

Next, an operation of the message delivery system according to the first embodiment will be described. The operation is divided into four operations: 1) delivery information notification; 2) member registration; 3) member initialization; and 4) message delivery. It should be noted that these operations may be performed by running corresponding control programs on a program-controlled processor.

1) Delivery Information Notification

First, the manager of the server 100 sets the initialization time information in the initialization time information memory 160. Timings when the content of a message to be delivered is changed may be stored as the initialization time information. For example, in the case where the server 100 sends a message having contents linked to television programs, the starting time of each television program is set as its initialization time, that is, timing when the content of a message to be delivered is changed.

Subsequently, the manager of the server 100 makes the initialization time information of the initialization time information memory 160 open to the user of the terminal 200. As long as the user can be notified of initialization time information, any means for making the initialization time information open to the public may be employed. For example, the server 100 may send a message including the initialization time information to the terminal 200, or display the initialization time information on its Web site page. The manager of the server 100 may use mass media such as television or press to release the initialization time information. Further, the manager of the server 100 may inform the user of the terminal 200 by word of mouth through telephone. Alternatively, it is possible to notify the user of the initialization time information through indirect information without sending individual initialization time information. For example, in the case where the initialization time information is the starting time of a certain television program, the user is informed of such and thereby the user can know the initialization time by referring to the television program column of a newspaper.

In such a way, the user of the terminal 200 can be informed when a message the user wishes to receive is delivered. For example, when the server 100 delivers messages linked to television programs, the broadcast time of a user's desired television program is the time when the user wishes to receive a message form the server 100.

It is to be noted that additional information related to the contents of messages to be delivered at each initialization time may be added to the initialization time information.

2) Member Registration

When the user of the terminal 200 wishes to receive a message from the server 100, the identification information of its own is sent to the member manager 130 of the server 100. As long as the member manager 130 can read the identification information, any means may be employed. For example, the terminal 200 may send a message including its identification information to the server 100, or inform the server 100 by means of communication such as World Wide Web (WWW). Alternatively, the user may inform the manager of the server 100 by word of mouth through telephone and requests registration of its identification and the manager enters the informed identification information into the server 100. When having received the identification information, the member manager 130 registers it into the member memory 110.

3) Member Initialization

Figure 4:
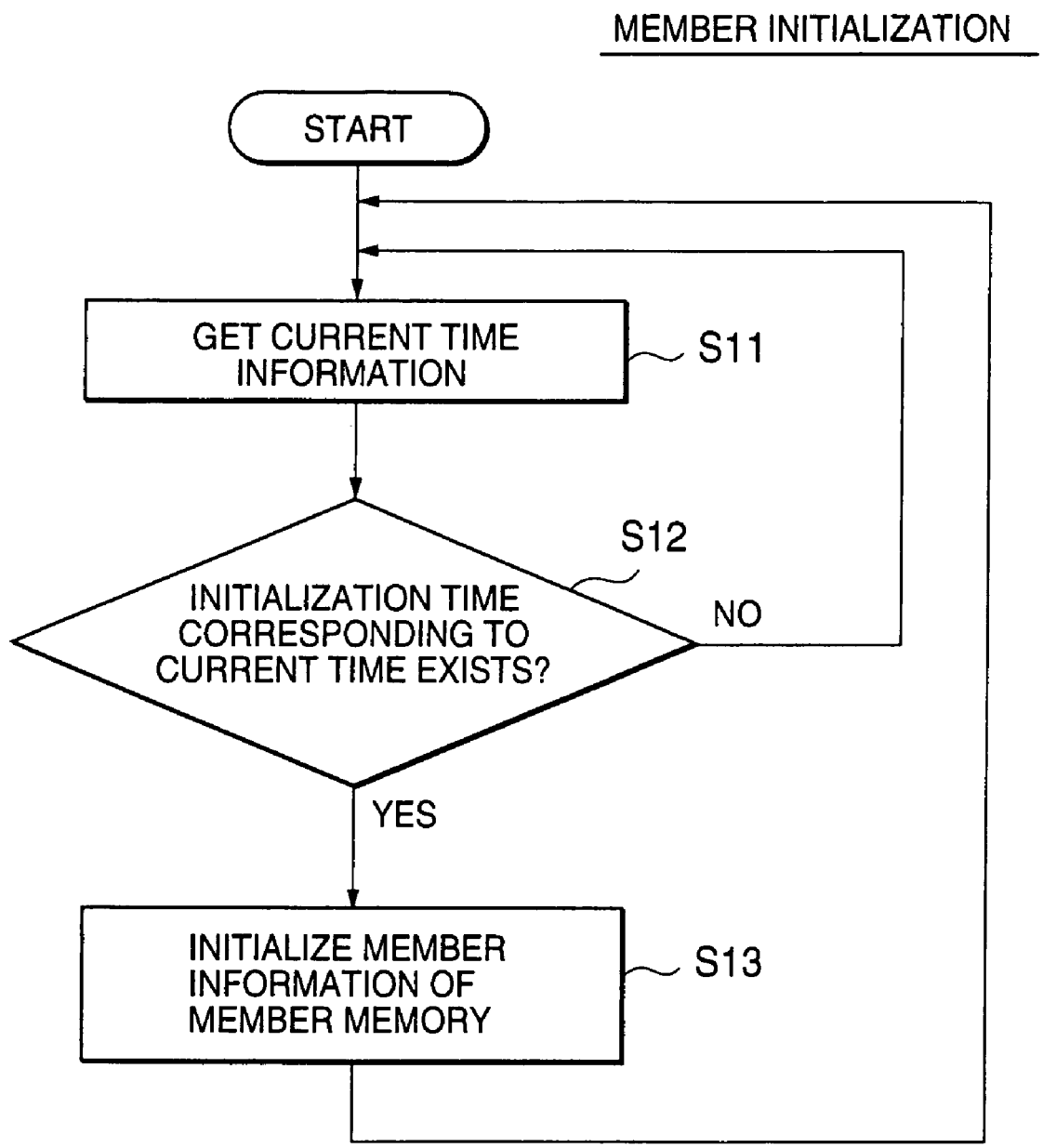
FIG. 4 is a flow chart showing a member initialization operation of a member manager of the first embodiment as shown in FIG. 1.

Referring to FIG. 4, the member manager 130 gets current time information from the clock/calendar 150 (step S11). Thereafter, the member manager 130 compares the current time information and the initialization time information stored in the initialization time information memory 160 to determine whether an initialization time is substantially coincident to the current time (step S12).

It is essential only that a match in the step S12 be found once for each initialization time. Any determination method may be employed as long as this essential condition is satisfied. For example, when an initialization time exists which has never matched so far and is previous to the current time, it may be determined that a match is found. Alternatively, when an initialization time exists which is subsequent to the previous initialization time checked at the step S12 and is previous to the current time, it may be determined that a match is found. In the case where the step S12 is repeated at sufficiently short intervals, when the current time is substantially equal to one of the initialization times, it may be determined that a match is found.

When no initialization time satisfying the above condition is found (NO in step S12), the steps S11 and S12 are repeatedly performed until an initialization time satisfying the above condition is found. When an initialization time satisfying the above condition is found (YES in step S12), the member manager 130 initializes the member memory 110 (step S13). As described above, such initialization causes the identification information of members stored in the member memory 110 to be canceled and reset to the initial state. Thereafter, the control goes back to the step S11 and the steps S11–S13 are repeated. The member manager 130 may wait a predetermined period of time before the control goes back to the step S11.

In this manner, the information in the member memory 110 is canceled every time the current time passes the initialization time points stored in the initialization time information memory 160.

4) Message Delivery

First, the manager of the server 100 uses the input section 140 to enter the content of a message to be sent. The input section 140 forwards the content to the transmitter 120. The transmitter 120 sends the message including the content to all the members identified by identification information stored in the member memory 110.

The content of a message may be inputted by the user of a terminal 200 or a third party authorized by the manager of the server 100. The content of a message may be inputted through an external device such as the terminal 200 by means of communication such as e-mail or WWW through the network 50.

In the case of a single party inputting messages in the server 100, this message delivery system becomes a broadcast-type information providing system. In the case of a plurality of members inputting messages, this message delivery system becomes an inter-member information providing system or a support system for communications among members.

As described above, since the member information in the member memory 110 is initialized when the current time passes each initialization time, all the user have to do is to register its own identification information into the server 100. Such registration allows the terminal 200 to receive a user-desired message from the server 100 for a desired period of time and there is no need of canceling the own identification information.

According to the first embodiment, the registration into the member memory 110 is performed only when the user requests it. Alternatively, it is possible to perform the registration at user-designated time, which will be described as a second embodiment of the present invention hereinafter.

Second Embodiment

Figure 5:
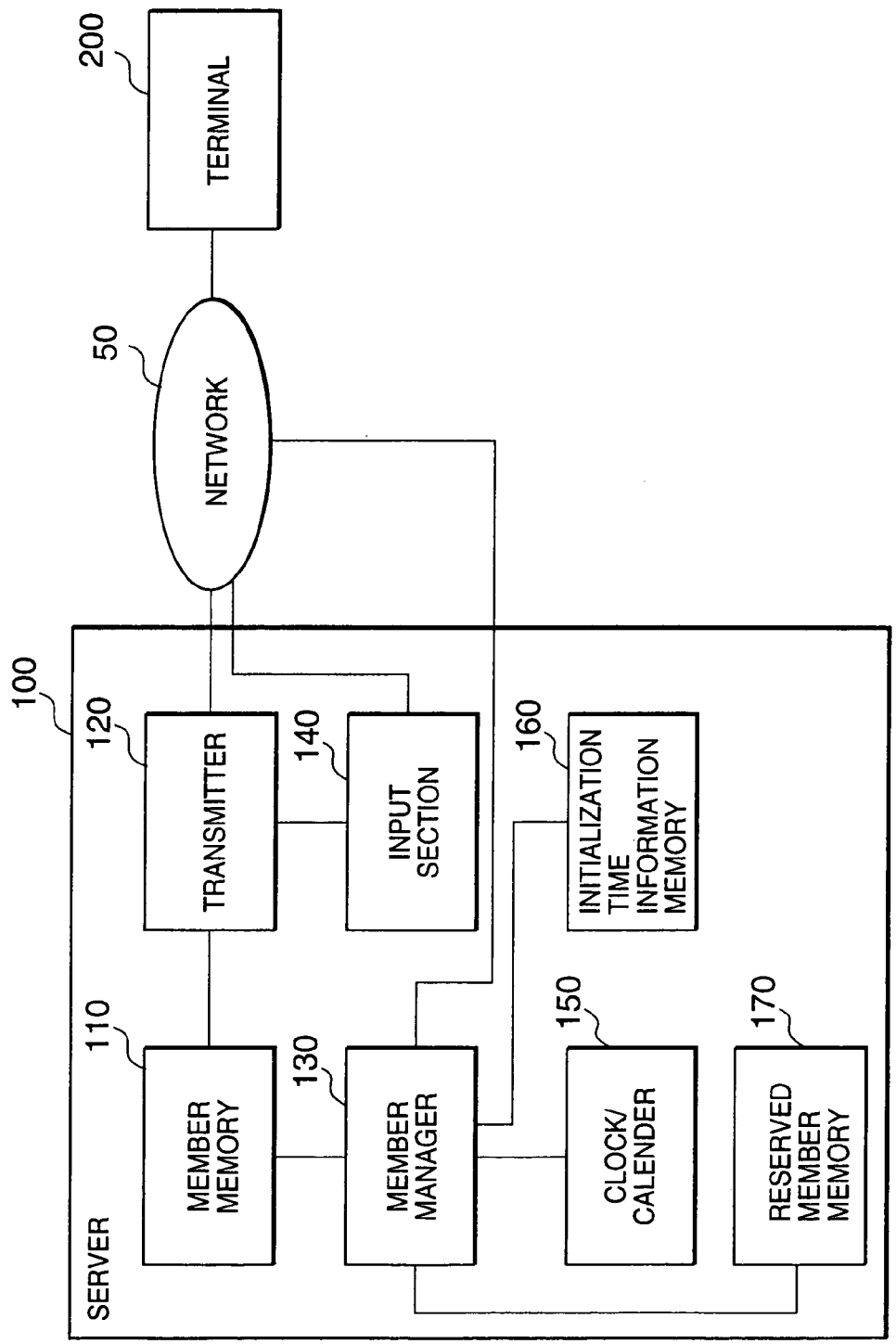
FIG. 5 is a block diagram showing a message delivery system according to a second embodiment of the present invention.

As shown in FIG. 5, a data delivery system according to the second embodiment has a system structure similar to the first embodiment. Accordingly, blocks similar to those previously described with reference to FIG. 1 are denoted by the same reference numerals and their details will be omitted.

A server 100 of the second embodiment is different from that of the first embodiment. More specifically, the server 100 is further provided with a reserved member memory 170. In association with the reserved member memory 170, the member manager 130 performs a different operation.

A reserved member is a user to be registered into the member memory 110. The reserved member memory 170 stores reserved member information that includes a list of reserved members (user identifications) and reserved times of day at which respective users are to be registered into the member memory 110.

In FIG. 6, an example of reserved member information stored in the reserved member memory 170 is shown. In this example, five e-mail addresses and reserved times of day for respective ones thereof are stored as reserved member information in the reserved member memory 170. For example, a user identified by its e-mail address "taro@aaa.bbb.ccc.ddd" is to be registered at 8:00, Mar. 22, 2001. Another user identified by its e-mail address "suzuki@xxx.yyy.zzz" is to be registered at 10:00, Mar. 22, 2001. The format of reserved member information stored in the reserved member memory 170 is not limited to that shown in FIG. 6. As long as a reserved time of day and user identification are readable, any format may be employed.

Next, an operation of the message delivery system according to the second embodiment will be described. The operation is divided into five processes: 1) delivery information notification; 2) reserved member registration; 3) member initialization; and 4) member registration, and 5) message delivery. Among these operations, only 2) reserved member registration and 4) member registration are different from the operations of the first embodiment as described before. Accordingly, these operations will be described in detail. It should be noted that these operations may be performed by running corresponding control programs on a program-controlled processor.

1) Delivery Information Notification

It is the same as the delivery information notification of the first embodiment.

2) Reserved Member Registration

The user of the terminal 200 sends reserved member information including the identification information of its own and the reserved time of day to the member manager 130 of the server 100. Similar to the first embodiment, as long as the member manager 130 can read the reserved member information, any means may be employed. When having received the reserved member information, the member manager 130 registers it into the reserved member memory 170.

When the user designates a plurality of reserved times of day, the member manager 130 registers reserved member information corresponding to respective ones of the reserved times of day into the reserved member memory 170. If a past time is designated as the reserved time of day, this request may be neglected. When the user sends only the identification information of its own without designating any reserved time of day, the member manager 130, similarly to the first embodiment, registers the identification information into the member memory 110.

3) Member Initialization

It is the same as the member initialization of the first embodiment (see FIG. 4).

4) Member Registration

Figure 7:
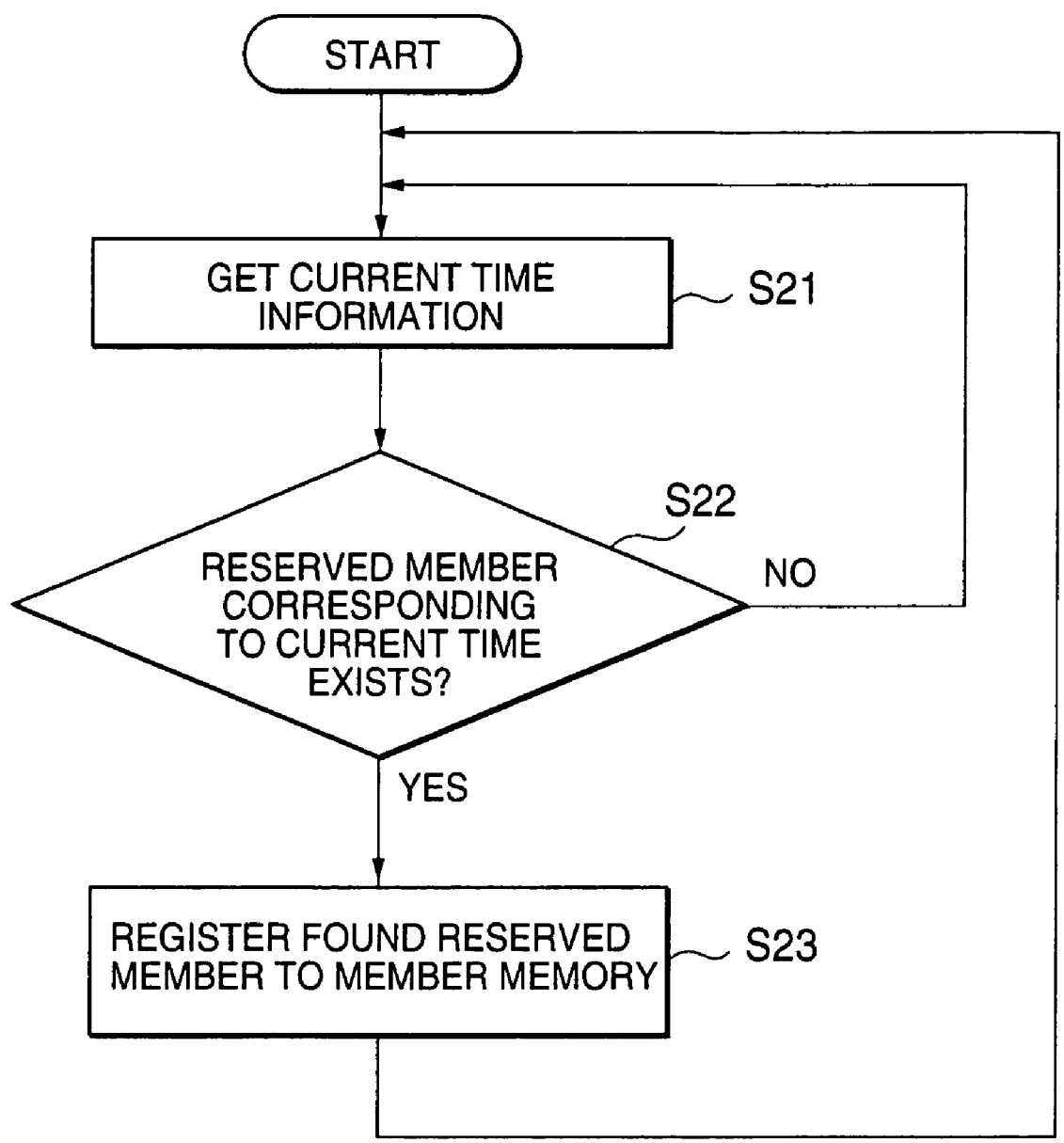
FIG. 7 is a flow chart showing a member registration operation of a member manager in the second embodiment as shown in FIG. 5.

Referring to FIG. 7, the member manager 130 gets current time information from the clock/calendar 150 (step S21). Thereafter, the member manager 130 compares the current time information and each of the reserved times stored in the reserved member memory 170 to determine whether a reserved time is substantially coincident to the current time (step S22).

It is essential only that a match in the step S22 be found once for each reserved time. Any determination method may be employed as long as this essential condition is satisfied. For example, when a reserved time exists which has never matched so far and is previous to the current time, it may be determined that a match is found. Alternatively, when a reserved time exists which is subsequent to the previous reserved time checked at the step S22 and is previous to the current time, it may be determined that a match is found. In the case where the step S22 is repeated at sufficiently short intervals, when the current time is substantially equal to one of the reserved times, it may be determined that a match is found.

When no reserved time satisfying the above condition is found (NO in step S22), the steps S21 and S22 are repeatedly performed until a reserved time satisfying the above condition is found. When a reserved time satisfying the above condition is found (YES in step S22), the member manager 130 registers the user identification information corresponding to the found reserved time into the member memory 110 and deletes the reserved member information from the reserved member memory 170 (step S23). Thereafter, the control goes back to the step S21 and the steps S21–S23 are repeated. The member manager 130 may wait a predetermined period of time before the control goes back to the step S21.

5) Message Delivery

It is the same as the message delivery of the first embodiment.

As described above, the member initialization (3) is separated from the member registration (4). However, they are not necessarily separated. The member manager 130 may continuously perform the member initialization (3) and the member registration (4). More specifically, the member manager 130 can sequentially perform the steps S11–S13 (FIG. 4) followed by the steps S22–S23 (FIG. 7). In this case, since the current time has been got at the step S11, the step S21 is not needed.

In the above example, the member registration (4) is repeatedly performed. However, the member registration (4) may be performed once every time the message delivery (5) is performed. For example, when the input section 140 has received a message to be delivered to members in the message delivery process (5), the member manager 130 starts the member registration (4).

When no reserved time satisfying the above condition is found (NO in step S22) or after the step S23, the member registration is completed and thereafter the message delivery (5) may further proceed. This can reduce the number of times the member registration (4) is performed.

As described above, the system according to the second embodiment has not only the advantages obtained by the first embodiment but also such an advantage that a user can reserve future message reception and can further request a plurality of times of day for future message reception.

Third Embodiment

According to a third embodiment of the present invention, the reserved member registration and the member registration are performed in a manner different from the second embodiment. A system according to the third embodiment has the same structure as that of the second embodiment as shown in FIG. 5. Accordingly, the description of the system structure is omitted.

Next, an operation of the message delivery system according to the third embodiment will be described. The operation is divided into five operations: 1) delivery information notification; 2) reserved member registration; 3) member initialization; and 4) member registration, and 5) message delivery. Among these operations, only 2) reserved member registration and 3) member initialization are different from the operations of the first embodiment as described before. Accordingly, these operations will be described in detail. It should be noted that these operations may be performed by running corresponding control programs on a program-controlled processor.

The reserved member registration in the third embodiment is the same as that in the second embodiment except for a registration procedure of registering reserved member information into the reserved member memory 170, which will be described below.

When having received reserved member information, the member manager 130 searches the initialization time information memory 160 for an initialization time that is the latest one before the reserved time included in the reserved member information. Subsequently, the member manager 130 replaces the reserved time of the reserved member information with the found initialization time and then registers the revised reserved member information into the reserved member memory 170. For example, when the member manager 130 receives reserved member information designating a reserved time as 8:35 from the terminal 200 of the user, the member manager 130 changes the reserved time from 8:35 to 8:30 and registers the reserved member information with the changed reserved time into the reserved member memory 170.

If the initialization time that is the latest one before the reserved time included in the reserved member information is a past time, this request may be neglected.

Figure 8:
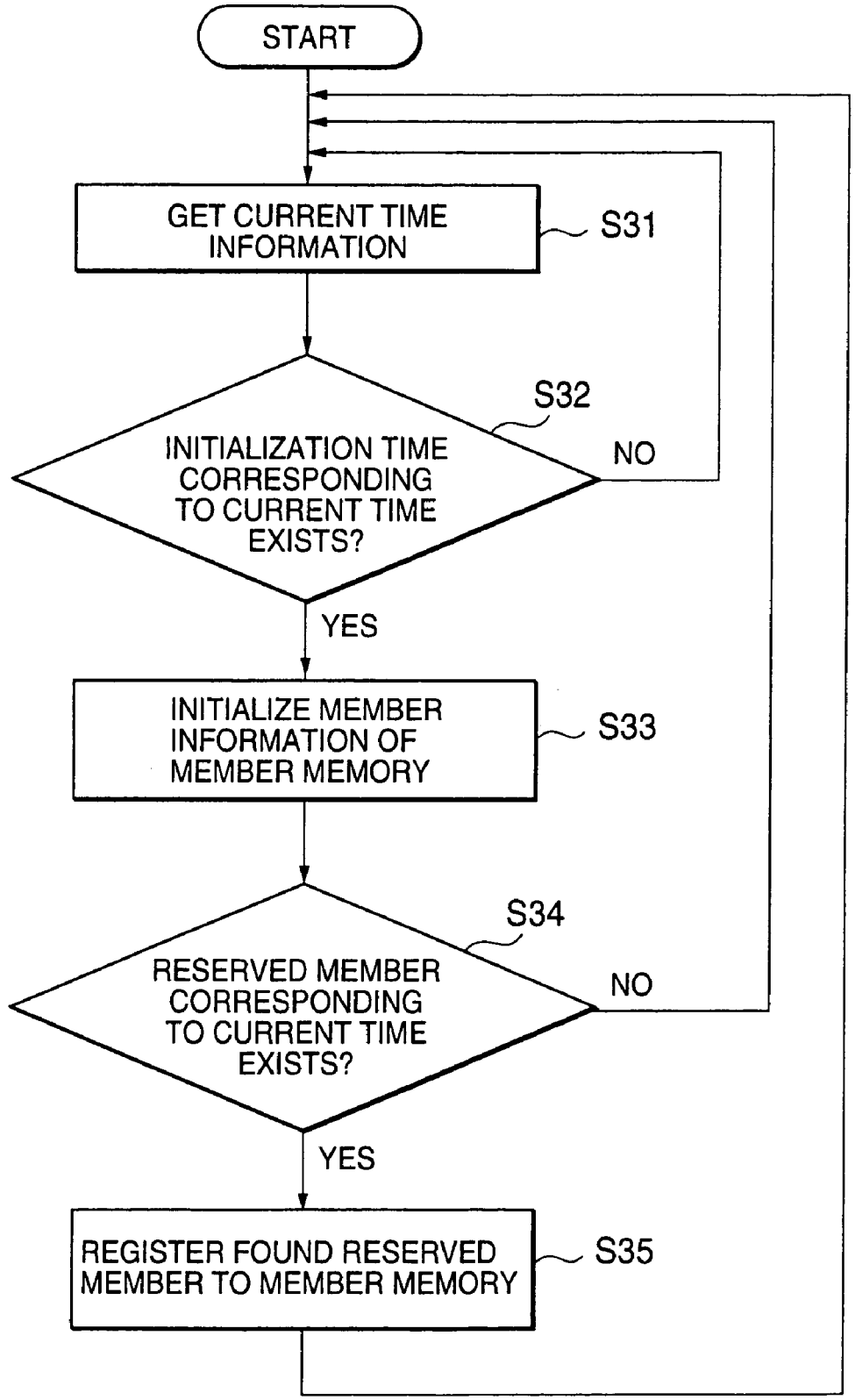
FIG. 8 is a flow chart showing member initialization and reserved member registration operations of a member manager in the second embodiment.

Referring to FIG. 8, the steps S31–S33 have the same contents as those of the steps S11–S13 as shown in FIG. 4. After the step S33, the control goes to the next step S34. The steps S34–S35 have the same contents as those of the steps S22–S23 as shown in FIG. 7. When no reserved time satisfying the above condition is found (NO in step S34) or after the step S35 has been completed, the control goes back to the step S31. In this manner, the steps S31–S35 are repeatedly performed.

As described above, the system according to the third embodiment has not only the advantages obtained by the second embodiment but also such an advantage that a user can start message reception from the initialization time that is the latest one before the user-designated reserved time.

Modified Embodiments

As described in the first to third embodiments, initialization time is notified to users in advance. As a modified embodiment, when the server 100 has registered a user into the member memory 110, the server 100 may send to the user a message including the first initialization time after the current time. This allows the user to be notified of the completion time of the message delivery.

Referring to FIG. 9, as another modified embodiment, the initialization time information memory 160 may store information regarding a message to be delivered after each initialization time. The server 100 may send to the user the message including the first initialization time after the current time as well as the information regarding the message. This allows the user to be also notified of the information regarding the delivered message.

As described in the first to third embodiments, an initialization time is fixed time information. However, it may be dynamic time information that is dynamically determined depending on a specific condition. For example, the completion time of a certain baseball game or the completion time of television relayed broadcasting of the baseball game is dynamic time information. In the case where such dynamically determined time information has been registered in the initialization time information memory 160, the member manager 130 neglects the dynamic time information when it is not determined. When it is determined, the member manager 130 changes it to fixed time information to be referred to. In this manner, the server 100 can deliver information linking with a dynamically determined time.

As described in the second and third embodiments, a user sends its own identification and a reserved time of day to the server 100 when the user wishes to reserve future message reception. However, as still another modified embodiment, the server 100 may manage abstract information corresponding to time information so that a user select abstract information, instead of the time information, to make reservation of future message reception. As an example of abstract information, information regarding a message to be delivered after each initialization time as shown in FIG. 9 may be used. When such abstract information is designated instead of time information, the member manager 130 converts the abstract information to corresponding time information and registers it as reserved time information into the reserved member memory. In this way, the user is allowed to request a reservation using information other than time.

As described in the first to third embodiments, a deletion operation of deleting member information from the member memory 110 is performed when the current time reaches an initialization time. It is possible to perform the deletion operation when the member manager 130 has received a deletion request from a user. In this manner, when a user comes upon a situation in which the message reception should be stopped, the message reception can be immediately stopped.

As described in the first to third embodiments, the initialization of the member memory 110 causes the identification information of all the members to be cancelled. However, the initialization may cause the identification information of all the members to be cancelled but special ones registered therein. Accordingly, as for the special members, the server 100 can deliver messages to the special members regardless of the initialization of the member memory 110.

The invention claimed is:

1. A system comprising:
a server;
at least one member terminal; and
a network,
wherein the server comprises:
a member memory for storing a list of identification information of registered members;
a reserved-member memory for storing a list of reserved-member information including at least one reserved time designated by at least one member and identification information of said at least one member;
a cancellation time memory for storing at least one cancellation time;
a member manager for managing the list of identification information registered in the member memory and the list of reserved-member information such that when a current time corresponds to one of said at least one cancellation time, the list of identification information in the member memory is canceled, and
when the current time corresponds to one of said at least one reserved time, reserved-member information in said reserved-member memory that corresponds to said at least one reserved time is registered into the member memory; and
a transmission controller for transmitting a message through the network to a member terminal having identification information registered in the member memory.

2. The system according to claim 1, wherein a single member is allowed to designate a plurality of reserved times at a time to store them in the reserved-member memory.

3. The system according to claim 1, wherein; every time the transmission controller transmits a message, the member manager determines whether the current time corresponds to one of said at Least one reserved time.

4. The system according to claim 1, wherein the member manager determines with a predetermined frequency whether the current time corresponds to one of said at least one cancellation time and whether the current time corresponds to one of said at least one reserved time.

5. The system according to claim 1, wherein the member manager determines whether each of said at least one cancellation time corresponds to a current time on a one-time basis and whether each of said at least one reserved time corresponds to a current time on a one-time basis.

6. The system according to claim 1, wherein the member manager sets one of said at least one cancellation time so as to be notified to a member.

7. The system according to claim 6, wherein the member manager places one of said at least one cancellation time on public view.

8. The system according to claim 6, wherein, when the member manager registers a member into the member memory, the transmission controller transmits to the member a message including a cancellation time immediately following the current time.

9. The system according to claim 6, wherein one of said at least one cancellation time is fixed.

10. The system according to claim 6, wherein one of said at least one cancellation time includes a dynamic time which is changeable, wherein the dynamic time is allowed to be fixed when said dynamic time has been determined.

11. The system according to claim 1, wherein abstract information allowed to be converted to time information is employed as a reserved time.

12. The system according to claim 1, wherein, when a deletion request has been received from a member, the member manager deletes identification information of the member from the member memory.

13. The system according to claim 1, wherein, when a current time corresponds to one of said at least one cancellation time, the member manager resets the member memory to an initial state.

14. The system according to claim 13, wherein the initial state comprises a state that the member memory is empty.

15. The system according to claim 13, wherein the initial state comprises a state that the member memory stores only identification information of at least one predetermined member.

16. The system according to claim 1, wherein the member manager changes a reserved time designated by a member to a latest cancellation time before the reserved time designated by the member and stores a changed reserved time into the reserved member memory.

17. The system according to claim 1, wherein the member manager determines whether the current time corresponds to one of said at least one cancellation time, and, after the list of identification information is canceled, continues to determine whether the current time corresponds to one of said at least one reserved time.

18. A method for delivering a message to at least one member terminal via a network, comprising:
storing a list of identification information of registered members in a member memory;
storing a list of reserved-member information including at least one reserved time designated by at least one member and identification information of said at least one member in a reserved-member memory;
storing at least one cancellation time in a cancellation time memory;
determining whether a current time corresponds to one of said at least one cancellation time;
when the current time corresponds to one of said at least one cancellation time, canceling the list of identification information in said member memory;
determining whether the current time corresponds to one of said at least one reserved time;
when the current time corresponds to one of said at least one reserved time, registering reserved-member information in said reserved-member memory that corresponds to said at least one reserved time; and
transmitting a message through the network to a member terminal having identification information registered in the member memory.

19. The method according to claim 18, wherein a single member is allowed to designate a plurality of reserved times at a time to store them in the reserved member memory.

20. The method according to claim 18, wherein, every time the transmission controller transmits a message, it is determined whether the current time corresponds to one of said at least one reserved time.

21. The method according to claim 18, wherein it is determined with a predetermined frequency whether the current time corresponds to one of said at least one cancellation time and whether the current time corresponds to one of said at least one reserved time.

22. A computer-readable medium storing a program for instructing a computer to perform a message delivery operation of delivering a message to at least one member terminal via a network, the program comprising:
instructions for storing a list of identification information of registered members in a member memory;
instructions for storing a list of reserved-member information including at least one reserved time designated by at least one member and identification information of said at least one member in a reserved-member memory;
instructions for storing at least one cancellation time in a cancellation time memory;
instructions for determining whether a current time corresponds to one of said at least one cancellation time;
instructions for canceling the list of identification information when the current time corresponds to one of said at least one cancellation time;
instructions for determining whether the current time corresponds to one of said at least one reserved time;
instructions for registering reserved-member information in said reserved-member memory that corresponds to one of said at least one reserved time when the current time corresponds to said one of said at least one reserved time; and
instructions for transmitting a message through the network to a member terminal having identification information registered in the member memory.

* * * * *